United States Patent [19]

Queen, Jr.

[11] 4,184,665
[45] Jan. 22, 1980

[54] THERMALLY ACTUATED WEDGE BLOCK

[75] Inventor: Charles C. Queen, Jr., Knoxville, Tenn.

[73] Assignee: The United States of America as represented by the United States Department of Energy, Washington, D.C.

[21] Appl. No.: 967,665

[22] Filed: Dec. 8, 1978

[51] Int. Cl.² ............................................. B66F 11/00
[52] U.S. Cl. .................................................. 254/104
[58] Field of Search ...................... 254/1, 104; 248/23, 248/188.2

[56] References Cited

U.S. PATENT DOCUMENTS

| 2,164,615 | 7/1939 | Mafera | 254/104 |
| 4,050,675 | 9/1977 | Mongillo | 254/104 |

FOREIGN PATENT DOCUMENTS

| 2409977 | 9/1974 | Fed. Rep. of Germany | 254/1 |
| 371163 | 5/1973 | U.S.S.R. | 254/104 |

Primary Examiner—Robert C. Watson
Attorney, Agent, or Firm—R. V. Lupo; Stephen D. Hamel; Louis M. Deckelmann

[57] ABSTRACT

This invention relates to an automatically-operating wedge block for maintaining intimate structural contact over wide temperature ranges, including cryogenic use. The wedging action depends on the relative thermal expansion of two materials having very different coefficients of thermal expansion. The wedge block expands in thickness when cooled to cryogenic temperatures and contracts in thickness when returned to room temperature.

4 Claims, 4 Drawing Figures

THERMALLY ACTUATED WEDGE BLOCK

BACKGROUND OF THE INVENTION

This invention was made in the course of, or under, a contract with the Department of Energy.

The Large Coil Test Facility (LCTF) of the Oak Ridge National Laboratory will be utilized for the testing and development of large superconducting magnet coils for future tokamak devices. In the LCTF, there are several structural interfaces that need to be loose at room temperature but structurally tight at the operating temperature (4° K.). Since the test stand operates in a vacuum environment, it will be impractical to tighten these joints manually. Also, space limitations and complexity make the use of remotely-operated equipment undesirable. Looking to the future, the radioactive environment of a large fusion tokamak will require that the number of manual operations near the torus be minimized.

Thus, the need exists for the provision of a number of passive wedge blocks to be installed in various locations throughout the test stand at room temperature. Upon cooling of the test stand to its cryogenic operating temperature, the wedge blocks should be adapted to expand in thickness to eliminate their clearances between structural members and be able to withstand high compressive loads for as long as may be required. On warm-up back to room temperature, the wedge blocks should then be adapted to retract to their initial dimensions. The present invention was conceived to meet this need in a manner to be described hereinbelow.

SUMMARY OF THE INVENTION

It is the object of the present invention to provide a wedge block that automatically produces a desired thickness change in the wedge block when its temperature is changed.

The above object has been accomplished in the present invention by providing a double wedge configuration comprising an inner tapered member fitted within a pair of reversed-tapered outer members all fitted together by means of a high thermal expansion tension rod, with the wedging parts (said members) being made from a low coefficient of thermal expansion material.

DESCRIPTION OF THE PREFERRED EMBODIMENTS

Figure 1:
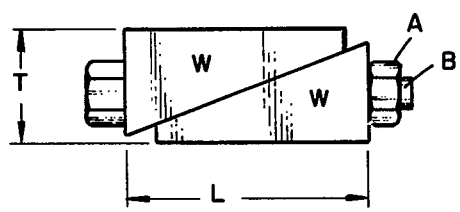
FIG. 1 is a schematic illustration of a conventional wedge block of the prior art.

With reference first to the prior art of FIG. 1, a simple conventional wedge block for manual actuation is shown. The wedging action depends on the loosening or tightening of the nut A on the bolt B which changes the thickness T of the assembly by sliding the two wedges W on one another. The overall length L of the wedge also increases or decreases as the thickness is changed.

Figure 2:
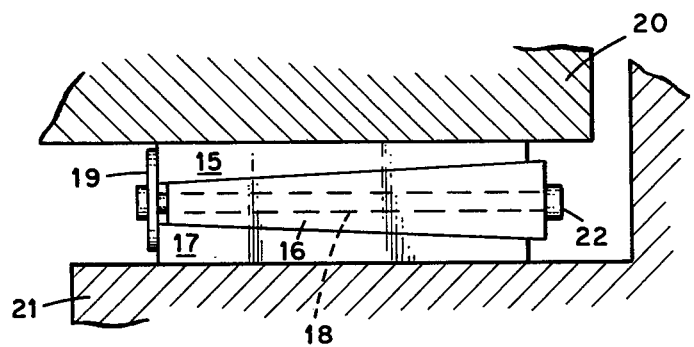
FIG. 2 is a schematic illustration of an automatic wedge block of the present invention.

With reference to FIG. 2 of the drawings, there is shown one embodiment of a wedge block of the present invention. In FIG. 2, a tapered wedge member 16 fits within two tapered wedge members 15, 17. A tension rod 18, provided with a suitable head, extends through an end plate 19, then through an axial hole in the wedge member 16, and is secured by means of a nut 22 exterior of the end of member 16, as shown. The end plate 19 rests against the ends of the wedge members 15, 17 and supports the head of the rod 18. The wedge block of FIG. 2 is effectively a double wedge, that is, its change in thickness will be twice that of the simple wedge of FIG. 1 for the same wedge angle.

The wedging parts 15, 16, 17 are made from a low coefficient of thermal expansion material such as the nickel alloy (Invar 36), for example. The tension rod 18, on the other hand, is made from a high thermal expansion material such as aluminum, for example.

The wedge block of FIG. 2 is positioned between any two desired structural members 20 and 21 of the test stand, and at room temperature the wedging members 15, 16, 17 of the wedge block are maintained in intimate contact with each other by means of the plate 19, the tension rod 18 and the nut 22 while at the same time providing the desired clearances between the exterior surfaces of the wedge members 15, 17 and the interior surfaces of the structural members 20, 21. Thus, as the wedge block is cooled to a cryogenic temperature, the tension rod 18 will contract axially to automatically effect the movement of the wedge member 16 toward the end plate 19 thus expanding the thickness of the wedge block into intimate structural contact with the members 20, 21. When the wedge block is returned to room temperature, the tension rod 18 will expand axially to permit the wedge block to contract in thickness.

Figure 3:
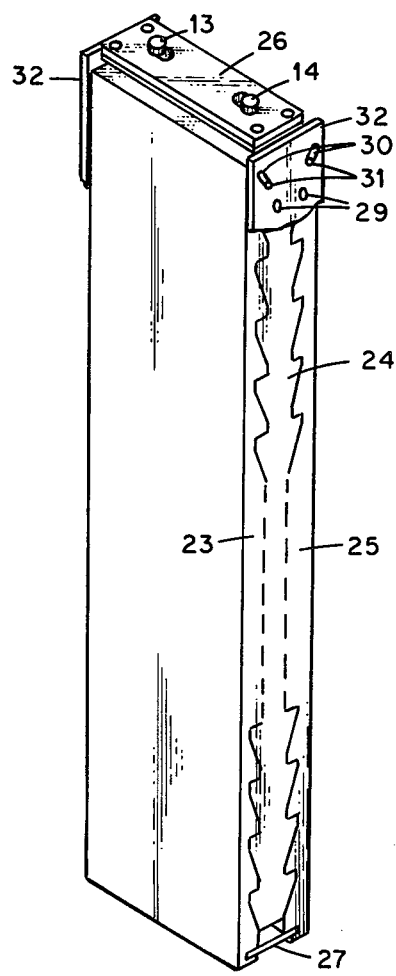
FIG. 3 is a schematic illustration of another embodiment of the present invention.
Figure 4:
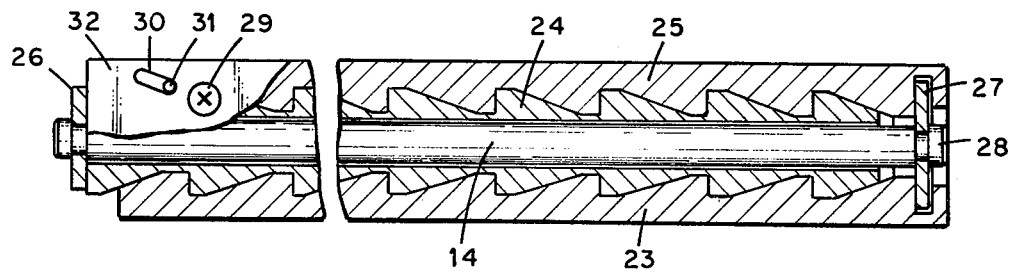
FIG. 4 is a sectional side view of the embodiment of FIG. 3.

FIGS. 3 and 4 illustrate another embodiment of the present invention which will now be described. The device of FIGS. 3 and 4 operates on the same principle as the device of FIG. 2 described above.

In FIGS. 3 and 4, the wedging surface of the interior Invar wedge member (or driver) 24 is broken up into a series of small angled surfaces, as shown, which considerably reduces the wedge thickness. As more clearly seen in FIG. 3, two aluminum tension rods 13 and 14 are provided and extend through suitable holes in the inner wedge member 24 (see FIG. 4 for the rod 14). It should be understood that the device of FIGS. 3 and 4 could be provided with a single tension rod, if such is desired, as in the FIG. 2 device.

The wedge member 24 fits within the two outer Invar wedge members 23, 25 which are provided with internal tapered surfaces to match the angled surfaces of the wedge member 24 as shown. An end plate 26 (FIG. 4) rests against the end of the wedge member 24 and the tension rods 13, 14 with suitable heads abutting against the end plate extend through the plate 26, through the wedge member 24, through another end plate 27 and are secured by means of respective nuts 28 to maintain the wedge members 23-25 in intimate contact each with the others. As shown, the end plate 27 rests in suitable slots in the respective wedge members 23 and 25 such that the temperature changes, the tension rods 13, 14 will either contract or expand in the same manner as the device of FIG. 2 to provide the desired wedging action. A pair of respective retaining plates 32 (FIG. 3) are provided and are secured to the wedge member 24 by means of respective screws 29. The respective retaining plates 32 are provided with a pair of slots 30 for receiving respective pins 31 affixed to the respective wedging members 23, 25 to thus allow relative motion between the wedge member 24 and the other two wedge members 23, 25 during temperature changes. A practical wedge angle for the device of FIGS. 3 and 4 is twenty degrees, for example, and by breaking up the wedging surface into a series of small angled surfaces, as mentioned above, provides for a reduction in the wedge thickness. For example, the wedge illustrated in FIGS. 3 and 4 is only 1.575 inches thick at room temperature, and at 4° K. it expands to 1.678 inches. The corresponding change in the length of the wedge is only 0.156 inch.

It should be understood that the above-described embodiments can be modified, if desired, to provide a wedge block that can be operated as it is heated above room temperature. This can be accomplished by making the wedging parts of high thermal expansion material and the tension rod or rods of low thermal expansion material.

In addition, it should be noted that a simple double wedge could be modified using the same basic principal of the present invention if provision is made to allow sliding of one of the wedges.

This invention has been described by way of illustration rather than by limitation and it should be apparent that it is equally applicable in fields other than those described.

What is claimed is:

1. An improved wedge block that automatically changes its thickness in response to changes in ambient air temperature comprising a first wedge member provided with external tapered surfaces and with an axial hole, a pair of second wedge members provided with internal tapered surfaces matching the tapered surfaces of said first wedge member, said first and second wedge members being constructed from a low thermal expansion material, a retaining end plate abutting against the ends of said second wedge members and provided with a hole, a tension rod provided with a head, said rod extending through the hole in said end plate and extending through the axial hole in said first wedge member with the head of said rod abutting against said end plate, and a nut affixed to the end of said tension rod, said nut abutting against the end of said first wedge member to maintain it in intimate contact with said second pair of wedge members along the tapered surfaces thereof, said tension rod being constructed from a high thermal expansion material, whereby a change in the temperature of the ambient air at said wedge block from room temperature to a lower temperature causes said tension rod to automatically contract axially thereby effecting an increase in said thickness of said wedge block.

2. The wedge block set forth in claim 1, wherein said wedge block is cooled to a cryogenic temperature.

3. The wedge block set forth in claim 2, wherein said low thermal expansion material is a nickel alloy and said high thermal expansion material is aluminum.

4. The wedge block set forth in claim 3, wherein the tapered surfaces of said wedge members comprise a plurality of matching angled surfaces.

* * * * *